No. 893,697. PATENTED JULY 21, 1908.
H. BARRY.
MILK TOP EXTRACTOR.
APPLICATION FILED MAY 25, 1907.

Witnesses
Howard D. Orr.
H. F. Riley

Henry Barry, Inventor,
By E. G. Siggers
Attorney

UNITED STATES PATENT OFFICE.

HENRY BARRY, OF CHICAGO, ILLINOIS.

MILK-TOP EXTRACTOR.

No. 893,697.  Specification of Letters Patent.  Patented July 21, 1908.

Application filed May 25, 1907. Serial No. 375,723.

*To all whom it may concern:*

Be it known that I, HENRY BARRY, a citizen of the United States, residing at Chicago, in the county of Cook and State of Illinois, have invented a new and useful Milk-Top Extractor, of which the following is a specification.

The invention relates to improvements in milk top extractors.

The object of the present invention is to improve the construction of milk top extractors, and to provide a simple, efficient and reliable milk top extractor of great strength and durability, adapted to be easily and cheaply manufactured of wire and sheet metal for use as an advertising novelty, and capable of quickly removing the top of a milk bottle without splashing the contents thereof.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
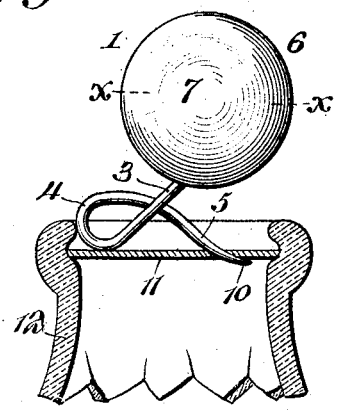
Figure 2:
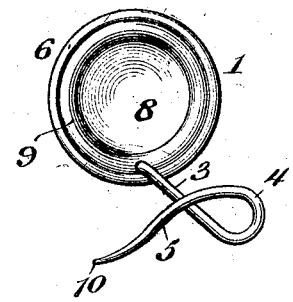
Figure 3:
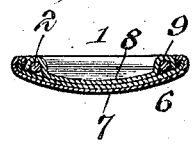
Figure 4:
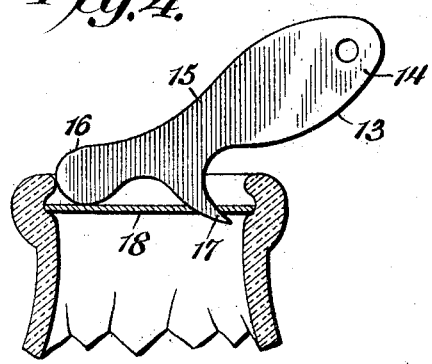
Figure 5:
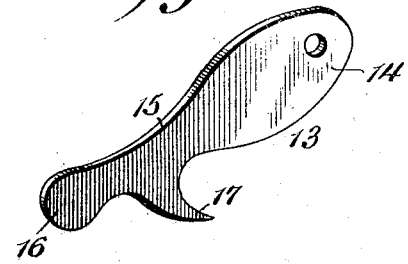

In the drawing:—Figure 1 is a side elevation of a milk top extractor, constructed in accordance with this invention and shown applied to the upper portion of a milk bottle, the milk bottle being in section. Fig. 2 is an elevation, showing the other side of the milk top extractor. Fig. 3 is a transverse sectional view on the line $x$—$x$ of Fig. 1. Fig. 4 is an elevation of a milk top extractor, illustrating a modification of the invention and shown applied to the upper portion of the milk bottle, the latter being in section. Fig. 5 is a perspective view of the milk top extractor, shown in Fig. 4.

Like numerals of reference designate corresponding parts in all the figures of the drawing.

1 designates a milk top extractor, embodying a lever constructed of wire and consisting of a handle loop 2, having an inclined shank 3, a substantially elliptical heel 4, forming a prolongation of the shank 3, and a downwardly and forwardly extending prong 5, arranged at an angle to the heel, and extending from the shank in the opposite direction from the heel 4 at the top thereof. The handle loop, the heel and the prong are constructed of a single piece of wire, which is coiled to form a handle loop, and the latter, which is circular, is adapted to receive a head or button 6 of sheet metal to enable the device to be used as an advertising novelty. The head or button is composed of a front plate or disk 7 and a back plate or disk 8, both constructed of sheet metal and connected at their edges. The periphery of the front plate is preferably spun over the periphery of the back plate, and the latter is provided at its inner face with an annular groove 9 to receive the handle loop 2, which is interposed between the front and back plates of the button. The front plate of the button is designed to receive a disk or plate of celluloid, or other material, bearing suitable advertising or other matter.

The heel consists of a substantially elliptical loop, which is formed by extending the shank 3 downwardly and then curving the wire upwardly and inwardly to the shank. The wire crosses the shank at the top of the loop and the prong, which consists of an extension of the top of the loop, is curved slightly at the engaging end 10, and is pointed to enable it to readily pierce a milk top 11. The bottom or outer portion of the heel is rounded to provide a rounded bearing portion for enabling the milk top extractor to be fulcrumed on a milk top at one side of a milk bottle 12, as clearly illustrated in Fig. 1 of the drawing. The prong 5 engages the milk top at the opposite side of the center thereof, and when the lever is swung upward, the prong is adapted to lift that side of the milk top uniformly from the bottle, while the opposite portion of the milk top is held by the heel. This will enable the milk top to be easily and quickly removed from the milk bottle, without splashing any of the contents of the latter.

In Figs. 4 and 5 of the drawing is illustrated a milk top extractor 13, constructed of a single piece of sheet metal, and consisting of an enlarged handle portion 14, provided with an inclined shank 15, a heel 16 and a prong 17. The heel, which forms a prolongation of the shank, is approximately elliptical, and presents a rounded bearing edge or surface to the bottle for fulcruming the device thereon and for holding one side of the milk top 18. The prong extends downwardly at an inclination in the opposite direction from the heel, and is connected with the shank at the top of said heel. The prong is pointed and slightly curved to enable it to readily pierce the milk top 18 and lift the same from the bottle.

In each form of the device, the milk top extractor presents a substantially elliptical heel or fulcrum to the milk top at one side of the milk bottle, and the prong engages the milk top at a point diametrically opposite the heel. The milk top is extracted by an upward movement of the handle of the device, which rocks on the fulcrum or heel. This lifts one side of the milk top clear of the bottle, and enables the milk top to be removed without splashing the contents of the bottle.

Having thus fully described my invention, what I claim as new and desire to secure by Letters Patent, is:—

1. A milk top extractor comprising a handle having a shank, a heel extending downwardly from the shank and arranged to bear against a milk top and also against the inner side of the mouth of a milk bottle, and a prong extending from the shank in the opposite direction from the heel and arranged to pierce the milk top at one side of the center and lift the said top.

2. A milk top extractor comprising a handle having an inclined shank, an inclined heel extending downwardly from and forming a prolongation of the shank and arranged to bear against the inner side of the mouth of a milk bottle and engage the milk top at one side of the center thereof, and an oppositely inclined prong arranged at an angle to the heel and piercing the milk top at the opposite side of the center, whereby the movement of the lever to lift the milk top will operate to hold the heel down on the same.

3. A milk top extractor comprising a handle, an inclined substantially elliptical heel extending downwardly therefrom and arranged to present a rounded edge or face to the mouth of a milk bottle at one side thereof and simultaneously engage the milk top, and a downwardly extending prong arranged at an angle to the heel and adapted to pierce the milk top at the opposite side of the center thereof from the point where the milk top is engaged by the heel.

4. A milk top extractor consisting of a lever constructed of a single piece of wire and comprising a substantially circular handle loop provided with an inclined shank, a substantially elliptical fulcrumed loop formed by extending the shank downwardly and curving the wire upwardly and inwardly to the said shank, and an inclined prong consisting of an extension of the top of the loop and arranged at an angle to the latter.

5. A milk top extractor comprising a wire lever consisting of a handle loop having a downwardly inclined shank, a fulcrum loop extending downwardly and outwardly from the lower end of the shank, and a prong extending from the shank in the opposite direction from the loop, and a button mounted on the handle loop and forming a handle.

6. A milk top extractor comprising a wire lever consisting of a handle loop having a downwardly inclined shank, a fulcrum loop extending downwardly and outwardly from the lower end of the shank, and a prong extending from the shank in the opposite direction from the loop, and a button mounted on the handle loop and forming a handle and composed of front and back disks or plates, the back disk or plate being provided with an interiorly arranged annular groove to receive the handle loop, which is interposed between the front and back plates.

7. A milk top extractor comprising a handle, a heel extending downwardly therefrom and arranged to bear against the mouth of a milk bottle at one side thereof and simultaneously engage the milk top, and a downwardly extending prong arranged at an angle to the heel and adapted to pierce the milk top at the opposite side of the center thereof from the point where the milk top is engaged by the heel.

In testimony, that I claim the foregoing as my own, I have hereto affixed my signature in the presence of two witnesses.

HENRY BARRY.

Witnesses:
 HARRY A. FLECK,
 ROBERT A. REID.